(12) United States Patent
Huang

(10) Patent No.: US 8,184,903 B2
(45) Date of Patent: May 22, 2012

(54) COLOR CORRECTION METHOD AND APPARATUS OF RGB SIGNAL

(75) Inventor: Ling-Shiou Huang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1201 days.

(21) Appl. No.: 11/976,046

(22) Filed: Oct. 19, 2007

(65) Prior Publication Data
US 2009/0103805 A1  Apr. 23, 2009

(51) Int. Cl.
*G06K 9/00* (2006.01)
(52) U.S. Cl. ............................... 382/167; 382/162
(58) Field of Classification Search .............. 382/167, 382/162
See application file for complete search history.

(56) References Cited

U.S. PATENT DOCUMENTS

| | | | | |
|---|---|---|---|---|
| 4,159,174 A | * | 6/1979 | Rising | 355/38 |
| 4,929,978 A | * | 5/1990 | Kanamori et al. | 355/38 |
| 4,953,008 A | * | 8/1990 | Kaye | 348/577 |
| 5,130,789 A | * | 7/1992 | Dobbs et al. | 358/500 |
| 5,202,935 A | * | 4/1993 | Kanamori et al. | 382/162 |
| 5,289,295 A | * | 2/1994 | Yumiba et al. | 358/518 |
| 5,315,694 A | * | 5/1994 | Kasano | 345/591 |
| 6,462,835 B1 | * | 10/2002 | Loushin et al. | 358/1.9 |
| 6,845,181 B2 | * | 1/2005 | Dupin et al. | 382/274 |
| 2006/0251323 A1 | | 11/2006 | MacKinnon et al. | |

FOREIGN PATENT DOCUMENTS

TW   200718223   5/2007

OTHER PUBLICATIONS

Matrix Operations for Image Processing, Paul Haeberli, http://www.graficaobscura.com/matrix/index.html 1993 Confirmed by InteretArchive.org for Aug. 20, 2006.*

* cited by examiner

*Primary Examiner* — Jingge Wu
*Assistant Examiner* — Sean Motsinger
(74) *Attorney, Agent, or Firm* — Rabin & Berdo, P.C.

(57) ABSTRACT

A color correction method of an RGB signal includes the following steps. First, an original RGB-coordinate point in an RGB color space is defined according to the RGB signal, and a reference plane is obtained according to the original RGB-coordinate point. The original RGB-coordinate point locates on the reference plane, all points on the reference plane have the same value with the original RGB-coordinate point, and the reference lane is orthogonal to a value axis. Next, an intersection point of the value axis and the reference plane is defined as an origin of the reference plane. Afterwards, the hue, saturation and value of the RGB signal are independently and continuously adjusted respectively by rotating the original RGB-coordinate point around the value axis, moving the original RGB-coordinate point towards to or away from the origin and shifting the original RGB-coordinate point along the value axis to obtain a new RGB-coordinate point.

2 Claims, 4 Drawing Sheets

COLOR CORRECTION METHOD AND APPARATUS OF RGB SIGNAL

BACKGROUND OF THE INVENTION

1. Field of the Invention

The invention relates in general to a color correction method and an apparatus of an RGB signal, and more particularly to a color correction method and an apparatus of an RGB signal capable of adjusting the hue (H), saturation (S) and value (V) of the RGB signal respectively, independently and continuously.

2. Description of the Related Art

Color correction such as adjustment of the hue (H), saturation (S) and value (V) of an RGB signal is performed in a liquid crystal display for high quality image. However, the adjustment is often operated in an HSV domain. Consequently, it is required to execute RGB/HSV and HSV/RGB conversions in the process of the adjustment of the hue, saturation and value of the RGB signal. One embodiment of the known RGB/HSV conversions is exemplified below.

$$f\max = \max(\max(R,G),B); \quad (10)$$

$$f\min = \min(\min(R,G),B); \quad (20)$$

$$\text{delta} = \max - f\min; \quad (30)$$

$$RR = (G-B)/\text{delta}; \quad (40)$$

$$GG = 2 + (B-R)/\text{delta}; \quad (50)$$

$$BB = 4 + (R-G)/\text{delta}; \quad (60)$$

$$\text{Value} = f\max; \quad (70)$$

$$\text{Saturation} = (\text{delta}/f\max); \quad (80)$$

$$\text{Hue} = (f\max == R) \times RR + ((f\max \sim= R) \& (f\max == G)) \times GG + ((f\max \sim= R) \times (f\max \sim= G) \& (f\max == B)) \times BB; \quad (90)$$

$$\text{Hue} = (H<0) \times (H+6 \times r) + (H>=0) \times (H); \quad (100)$$

However, in the process of the RGB/HSV conversion and its inverse conversion, it will result in the problem of discontinuity in the process of color correction of the RGB signal because of the conditional formulae. Hence, the image frame corresponding to the RGB signal is not smooth.

SUMMARY OF THE INVENTION

The invention is directed to a color correction method and an apparatus of an RGB signal, using a simple color correction method such that the hue (H), saturation (S) and value (V) of the RGB signal may be separately adjusted independently and continuously without having to execute RGB/HSV and HSV/RGB conversions.

According to a first aspect of the present invention, a color correction method of an RGB signal is provided. First, an original RGB-coordinate point in an RGB color space is defined according to the RGB signal, and a reference plane is obtained according to the original RGB-coordinate point. The original RGB-coordinate point locates on the reference plane, all points on the reference plane have the same value with the original RGB-coordinate point, and the reference lane is orthogonal to a value axis. Next, an intersection point of the value axis and the reference plane is defined as an origin of the reference plane. Afterwards, the hue (H), saturation (S) and value (V) of the RGB signal are independently and continuously adjusted respectively by rotating the original RGB-coordinate point around the value axis, moving the original RGB-coordinate point towards to or away from the origin and shifting the original RGB-coordinate point along the value axis to obtain a new RGB-coordinate point, which corresponds to a new RGB signal.

According to a second aspect of the present invention, a color correction method of an RGB signal is provided. First, an original RGB-coordinate point corresponding to the RGB signal in an RGB color space is transformed to a two-dimension original polar-coordinate point on a reference plane. All points on the reference have the same value with the RGB signal, the reference plane is orthogonal to a value axis, and the reference plane has an origin. Next, at least one of the following steps is executed: adjusting the radian of the two-dimension original polar-coordinate point; adjusting the radius of the two-dimension original polar-coordinate point; and shifting the reference plane, on which the two-dimension original polar-coordinate point locates, along the value axis. The adjusted two-dimension original polar-coordinate point and the adjusted reference plane correspond to a new RGB signal.

According to a third aspect of the present invention, a color correction method of an RGB signal is provided. First, an original RGB-coordinate point corresponding to the RGB signal in an RGB color space is transformed to a two-dimension original coordinate point on a reference plane. All points on the reference have the same value with the RGB signal, the reference plane is orthogonal to a value axis, the reference plane has an origin, and the three coordinate axes of the RGB color space correspond to a two-dimension R-vector, a two-dimension G-vector and a two-dimension B-vector on the reference plane. Next, at least one of the following steps is executed: adjusting the radian of the vector, formed by the two-dimension original coordinate point and the origin, corresponding to one of the two-dimension R-vector, the two-dimension G-vector and the two-dimension B-vector; adjusting the distance between the two-dimension original coordinate point and the origin; and shifting the reference plane along the value axis. Afterwards, the adjusted two-dimension original coordinate point is transformed to a new RGB-coordinate point in the RGB color space, the new RGB-coordinate point corresponding to a new RGB signal.

According to a third aspect of the present invention, a color correction apparatus of an RGB signal is provided. The color correction apparatus of an RGB signal includes a reference plane generating unit and an adjusting unit. The reference plane generating unit defines an original RGB-coordinate point in an RGB color space according to the RGB signal, and obtains a reference plane according to the original RGB-coordinate point. The original RGB-coordinate point locates on the reference plane, all points on the reference plane have the same value with the original RGB-coordinate point, the reference lane is orthogonal to a value axis, and an intersection point of the value axis and the reference plane is an origin of the reference plane. The adjusting unit independently and continuously adjusts the hue (H), saturation (S) and value (V) of the RGB signal respectively by rotating the original RGB-coordinate point around the value axis, moving the original RGB-coordinate point towards to or away from the origin and shifting the original RGB-coordinate point along the value axis to obtain a new RGB-coordinate point, which corresponds to a new RGB signal.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a color correction method and an apparatus of an RGB signal, capable of separately adjusting the hue (H), saturation (S) and value (V) of the RGB signal independently and continuously without having to execute RGB/HSV and HSV/RGB conversions.

Figure 1:
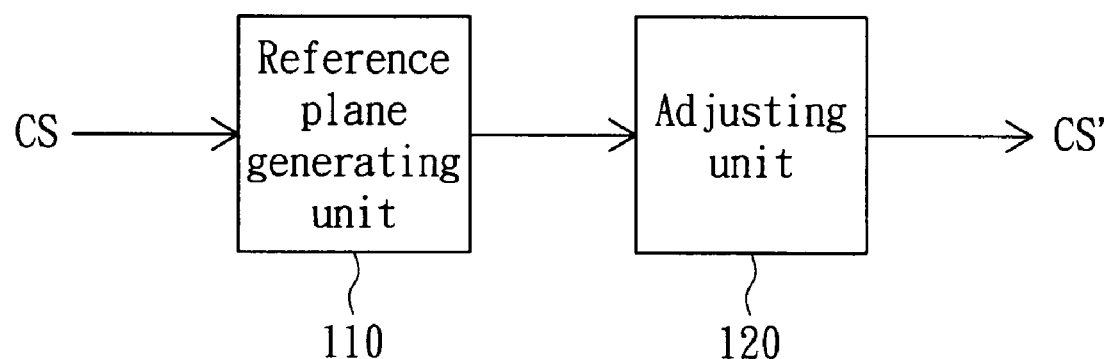
FIG. 1 is a block diagram of a color correction apparatus of an RGB signal according to a preferred embodiment of the invention.

Referring to FIG. 1, a block diagram of a color correction apparatus of an RGB signal according to a preferred embodiment of the invention is shown. The color correction apparatus 100 includes a reference plane generating unit 110 and an adjusting unit 120. The reference plane generating unit 110 defines an original RGB-coordinate point in an RGB color space according to an RGB signal CS, and obtains a reference plane according to the original RGB-coordinate point. The original RGB-coordinate point locates on the reference plane, and all points on the reference plane have the same value with the original RGB-coordinate point. Besides, the reference plane generating unit 110 averages the coordinates of the original RGB-coordinate point to obtain the value of the RGB signal CS.

In addition, the reference lane is orthogonal to a value axis, and an intersection point of the value axis and the reference plane is an origin of the reference plane. The adjusting unit 120 independently and continuously adjusts the hue, saturation and value of the RGB signal respectively by rotating the original RGB-coordinate point around the value axis, moving the original RGB-coordinate point towards to or away from the origin and shifting the original RGB-coordinate point along the value axis to obtain a new RGB-coordinate point, which corresponds to a new RGB signal CS'.

Figure 2:
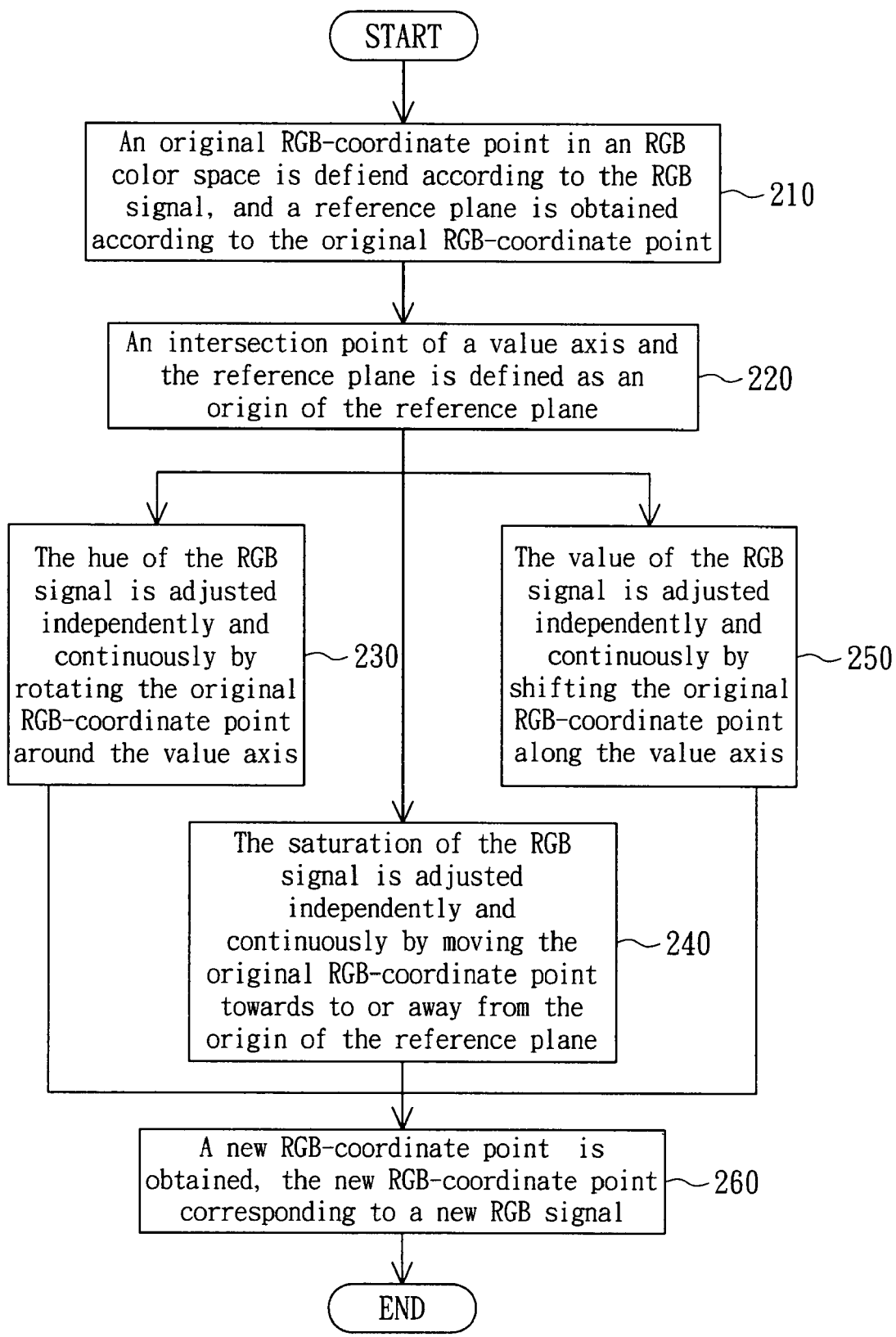
FIG. 2 is a flowchart of a color correction method of an RGB signal according to a preferred embodiment of the invention.

Referring to FIG. 2, a flowchart of a color correction method of an RGB signal according to a preferred embodiment of the invention is shown. Firstly, the color correction method begins at step 210, an original RGB-coordinate point in an RGB color space is defined according to the RGB signal CS, and a reference plane is obtained according to the original RGB-coordinate point. The original RGB-coordinate point locates on the reference plane, and all points on the reference plane have the same value with the original RGB-coordinate point.

Figure 3A:
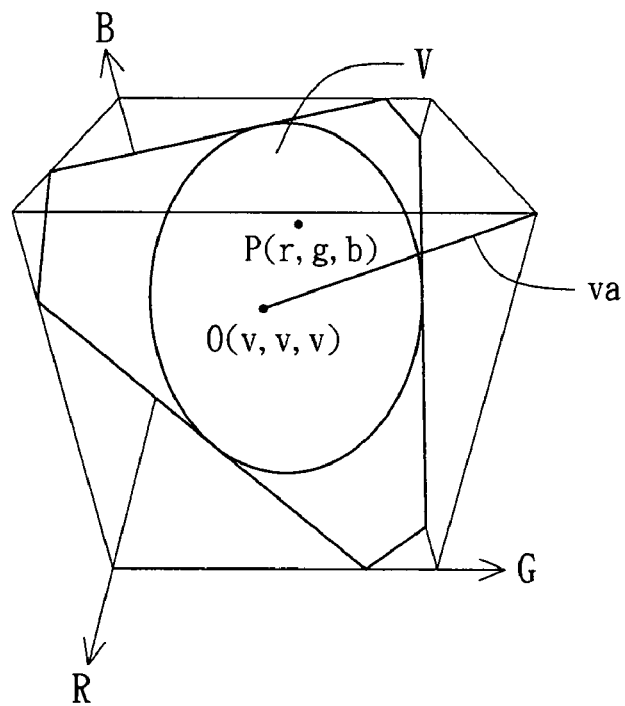
FIG. 3A is a perspective of an RGB color space according to a preferred embodiment of the invention.

Next, in the step 220, an intersection point of a value axis and the reference plane is defined as an origin of the reference plane. The reference plane is substantially orthogonal to the value axis, which is a class of all points, of which the R coordinate, G coordinate and B coordinate of each one are equal to each other, in the RGB color space. Referring to FIG. 3A, a perspective of an RGB color space according to a preferred embodiment of the invention is shown. The RGB signal CS corresponds to the original RGB-coordinate point P(r, g, b) in the RGB color space. The reference plane V is located in the RGB color space and corresponds to a value v, which is the value of the RGB signal CS.

The original RGB-coordinate point P is on the reference plane V, and all points on the reference plane V have the same value v with the original RGB-coordinate P. The value v is an average of the coordinates of the original RGB-coordinate P (r,g,b), that is, the value v=(r+g+b)/3. In addition, the value axis va is orthogonal to the reference plane V, and the intersection point O(v, v, v) is defined as the origin of the reference plane V.

Figure 3B:
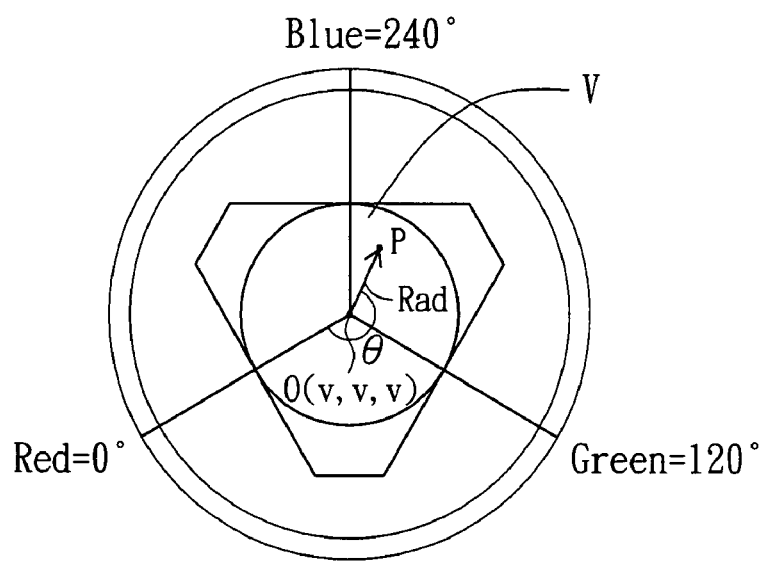
FIG. 3B is a perspective of the reference plane V according to a preferred embodiment of the invention.

Then, the color correction method proceeds to step 230, the hue of the RGB signal CS is adjusted independently and continuously by rotating the original RGB-coordinate point P around the value axis va. Referring to FIG. 3B, a perspective of the reference plane V according to a preferred embodiment of the invention is shown. As indicated in FIG. 3B, an R-axis of the RGB color space is mapped onto the reference plane V to form a two-dimension R-vector Red. Meanwhile, a G-axis of the RGB color space is mapped onto the reference plane V to form a two-dimension G-vector Green. And a B-axis of the RGB color space is mapped onto the reference plane V to form a two-dimension B-vector Blue.

The hue of the RGB signal CS may be adjusted by adjusting an included angle between a vector Rad, formed by the original RGB-coordinate point P and the origin O, and one of the two-dimension R-vector Red, the two-dimension G-vector Green and the two-dimension B-vector Blue. For example, let the two-dimension R-vector Red be defined as 0 degree, the two-dimension G-vector Green be defined as 120 degrees, and the two-dimension B-vector Blue be defined as 240 degrees, then the radian θ between the vector Rad and the two-dimension R-vector Red is the hue of the RGB signal CS. Thus, the hue of the RGB signal CS may be adjusted by rotating the original RGB-coordinate point P around the value axis va.

In step 240, the saturation of the RGB signal CS is adjusted independently and continuously by moving the original RGB-coordinate point P towards to or away from the origin O of the reference plane V. That is, the saturation of the RGB signal CS may be adjusted by adjusting the distance between the original RGB-coordinate point P and the origin O. Besides, in the step 250, the value of the RGB signal CS is adjusted independently and continuously by shifting the original RGB-coordinate point P along the value axis va.

Afterwards, in the step 260, a new RGB-coordinate point P' (not shown) is obtained, the new RGB-coordinate point P' corresponding to the new RGB signal CS'. In the steps 230, 240 and 250 mentioned above, the hue, saturation and value of the RGB signal CS may be adjusted independently and continuously without having to execute RGB/HSV and HSV/RGB conversions, and then a new RGB signal CS' is obtained.

Figure 4:
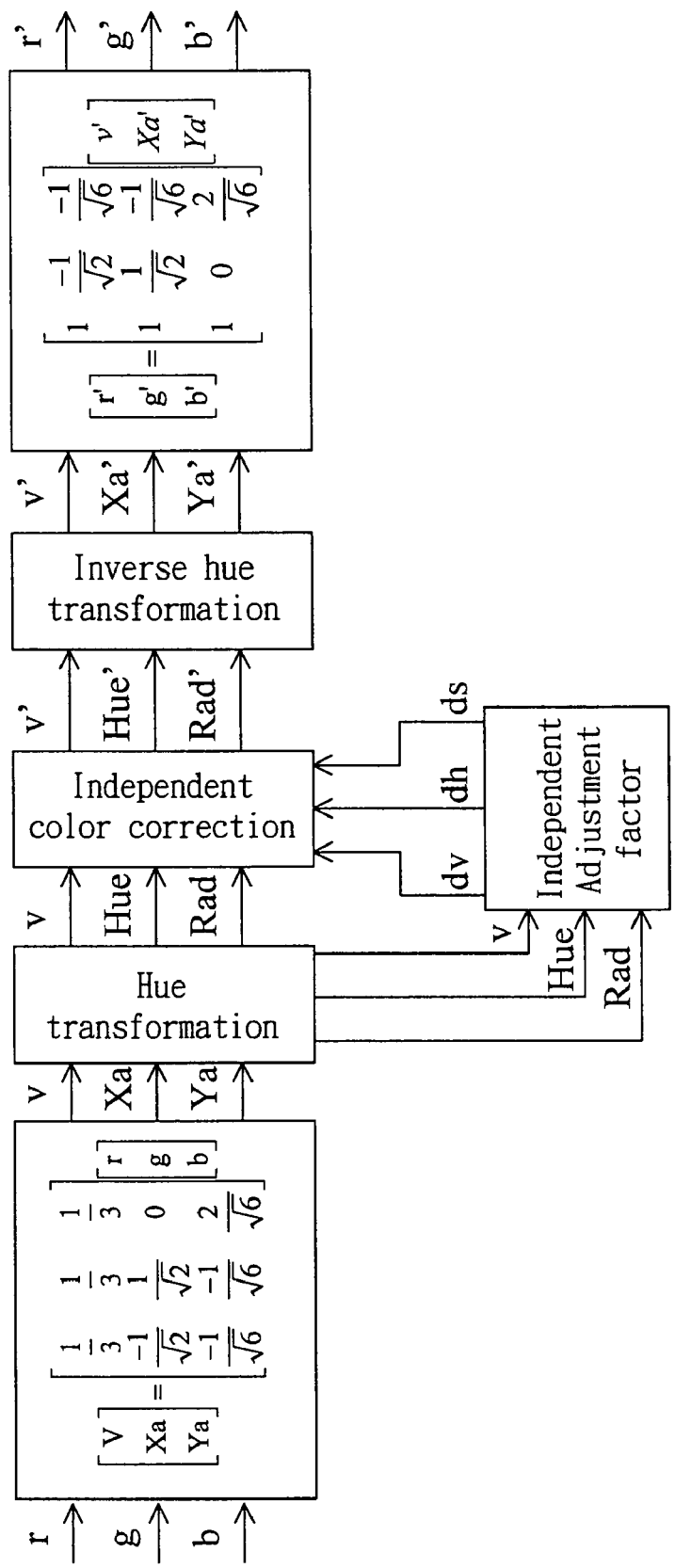
FIG. 4 is a diagram showing a color correction method of an RGB signal according to a preferred embodiment of the invention.

Referring to FIG. 4, a diagram showing a color correction method of an RGB signal according to a preferred embodiment of the invention is shown. Firstly, an original RGB-coordinate point P (r, g, b) is transformed to a two-dimension original coordinate point (v, Xa, Ya) of the reference plane V according to an adjacent matrix expressed as:

$$\begin{bmatrix} \frac{1}{3} & \frac{1}{3} & \frac{1}{3} \\ \frac{-1}{\sqrt{2}} & \frac{1}{\sqrt{2}} & 0 \\ \frac{-1}{\sqrt{6}} & \frac{-1}{\sqrt{6}} & \frac{2}{\sqrt{6}} \end{bmatrix}.$$

Next, the two-dimension original coordinate point (v, Xa, Ya) is transformed into a two-dimension polar-coordinate point (v, Hue, Rad) via a hue transformation. Compared with FIG. 3B, Rad=$((r-v)^2+(g-v)^2+(b-v)^2)^{0.5}$, and Hue=$(\tan^{-1}(Ya/Xa) \times 180/\pi)+150$. Afterwards, the two-dimension polar-coordinate point (v, Hue, Rad) is adjusted to a two-dimension new polar-coordinate point (v', Hue', Rad') according to independent adjustment factors (dv, dh, ds).

The independent adjustment factors (dv, dh, ds) are substantially for adjusting the value, hue and saturation of the RGB signal CS. The relationship between the two-dimension new polar-coordinate point (v', Hue', Rad') and the two-dimension original polar-coordinate point (v, Hue, Rad) is expressed as:

v'=v×dv;

Hue'=Hue+dh;

Rad'=Rad×ds;

After this step, the value, hue and saturation of the RGB signal CS has been substantially adjusted independently and continuously.

Then, the two-dimension new polar-coordinate point (v', Hue', Rad') is transformed to a two-dimension new coordinate point (v'; Xa', Ya') via an inverse hue transformation, corresponding to the he transformation in the preceding step. After that, the two-dimension new coordinate point (v', Xa', Ya') is transformed to a new RGB-coordinate point P' (r', g', b') in the RGB color space according to an inverse adjacent matrix. The new RGB-coordinate point P' (r', g', b') corresponds to the new RGB signal CS'. The inverse adjacent matrix is expressed as:

$$\begin{bmatrix} 1 & \frac{-1}{\sqrt{2}} & \frac{-1}{\sqrt{6}} \\ 1 & \frac{1}{\sqrt{2}} & \frac{-1}{\sqrt{6}} \\ 1 & 0 & \frac{2}{\sqrt{6}} \end{bmatrix}.$$

According to the color correction method and apparatus of an RGB signal disclosed in the above embodiment of the invention, the hue (H), saturation (S) and the value (V) of the RGB signal can be respectively and independently adjusted without executing RGB/HSV and HSV/RGB conversions. Besides, without the conditional formulae that are not proper for color correction of the RGB signal, the conventional problem of discontinuity is solved. Thus, the invention achieves continuity and independence in the adjustment of the hue, saturation and value of the RGB signal, such that the image frame corresponding to the RGB signal is smooth.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A color correction method of an RGB signal, comprising;
   (a) transforming an original RGB-coordinate point corresponding to the RGB signal in an RGB color space to a two-dimension original coordinate point on a reference plane of the RGB color space, wherein all points on the reference have the same value with the RGB signal, the reference plane is orthogonal to a value axis, the reference plane has an origin, the three coordinate axes of the RGB color space correspond to a two-dimension R-vector, a two-dimension G-vector and a two-dimension B-vector on the reference plane;
   (b) executing at least one of the following steps:
      (b1) adjusting the radian of the vector, formed by the two-dimension original coordinate point and the origin, corresponding to one of the two-dimension R-vector, the two-dimension G-vector and the two-dimension B-vector;
      (b2) adjusting the distance between the two-dimension original coordinate point and the origin; and
      (b3) shifting the reference plane along the value axis; and
   (c) transforming the adjusted two-dimension original coordinate point to a new RGB-coordinate point in the RGB color space, the new RGB-coordinate point corresponding to a new RGB signal, wherein the original RGB-coordinate point is transformed to the two-dimension original point according to an adjacent matrix, the two-dimension R-vector is defined as 0 degrees, the two-dimension G-vector is defined as 120 degrees, the two-dimension B-vector is defined as 240 degrees, and the adjacent matrix is expressed as:

$$\begin{bmatrix} \frac{1}{3} & \frac{1}{3} & \frac{1}{3} \\ \frac{-1}{\sqrt{2}} & \frac{1}{\sqrt{2}} & 0 \\ \frac{-1}{\sqrt{6}} & \frac{-1}{\sqrt{6}} & \frac{2}{\sqrt{6}} \end{bmatrix}.$$

2. A color correction method of an RGB signal, comprising;
   (a) transforming an original RGB-coordinate point corresponding to the RGB signal in an RGB color space to a two-dimension original coordinate point on a reference plane of the RGB color space, wherein all points on the reference have the same value with the RGB signal, the reference plane is orthogonal to a value axis, the reference plane has an origin, the three coordinate axes of the RGB color space correspond to a two-dimension R-vector, a two-dimension G-vector and a two-dimension B-vector on the reference plane;
   (b) executing at least one of the following steps:
      (b1) adjusting the radian of the vector, formed by the two-dimension original coordinate point and the origin, corresponding to one of the two-dimension R-vector, the two-dimension G-vector and the two-dimension B-vector;
      (b2) adjusting the distance between the two-dimension original coordinate point and the origin; and
      (b3) shifting the reference plane along the value axis; and
   (c) transforming the adjusted two-dimension original coordinate point to a new RGB-coordinate point in the RGB color space, the new RGB-coordinate point corresponding to a new RGB signal, the adjusted two-dimension original coordinate point is transformed to the new RGB-coordinate point according to an inverse adjacent matrix, the two-dimension R-vector is defined as 0 degrees, the two-dimension G-vector is defined as 120 degrees, the two-dimension B-vector is defined as 240 degrees, and the inverse adjacent matrix is expressed as:

$$\begin{bmatrix} 1 & \frac{-1}{\sqrt{2}} & \frac{-1}{\sqrt{6}} \\ 1 & \frac{1}{\sqrt{2}} & \frac{-1}{\sqrt{6}} \\ 1 & 0 & \frac{2}{\sqrt{6}} \end{bmatrix}.$$

* * * * *